United States Patent
Yoon et al.

(10) Patent No.: US 8,548,513 B2
(45) Date of Patent: Oct. 1, 2013

(54) APPARATUS AND METHOD FOR TRANSMITTING AND RECEIVING CONTROL INFORMATION IN WIRELESS COMMUNICATION SYSTEM

(75) Inventors: Sungjun Yoon, Seoul (KR); Kibum Kwon, Ansan-si (KR); Kitae Kim, Suwon-si (KR)

(73) Assignee: Pantech Co., Ltd., Seoul (KR)

( * ) Notice: Subject to any disclaimer, the term of this patent is extended or adjusted under 35 U.S.C. 154(b) by 396 days.

(21) Appl. No.: 12/902,953

(22) Filed: Oct. 12, 2010

(65) Prior Publication Data

US 2011/0086659 A1 Apr. 14, 2011

(30) Foreign Application Priority Data

Oct. 12, 2009 (KR) ........................ 10-2009-0096983
Sep. 15, 2010 (KR) ........................ 10-2010-0090803

(51) Int. Cl.
*H04W 84/08* (2009.01)

(52) U.S. Cl.
USPC ........ 455/509; 455/450; 455/420; 455/552.1; 370/230; 370/329; 370/332

(58) Field of Classification Search
USPC ................... 455/509, 500, 414.1, 432.2, 450, 455/464, 67.11, 67.16, 552.1, 177.1, 186.1, 455/420; 370/343, 329, 328, 474, 252
See application file for complete search history.

(56) References Cited

U.S. PATENT DOCUMENTS

| | | | | |
|---|---|---|---|---|
| 7,127,004 | B1 * | 10/2006 | Sonning et al. | 375/295 |
| 2003/0179712 | A1 * | 9/2003 | Kobayashi et al. | 370/249 |
| 2009/0219910 | A1 * | 9/2009 | Han et al. | 370/343 |
| 2010/0260057 | A1 | 10/2010 | Lee et al. | |
| 2010/0296473 | A1 * | 11/2010 | Kim et al. | 370/329 |
| 2011/0038275 | A1 * | 2/2011 | Kim et al. | 370/252 |
| 2011/0281601 | A1 * | 11/2011 | Ahn et al. | 455/500 |
| 2012/0042221 | A1 * | 2/2012 | Kim et al. | 714/749 |
| 2012/0063351 | A1 * | 3/2012 | Kim et al. | 370/252 |
| 2012/0076104 | A1 * | 3/2012 | Chun et al. | 370/329 |
| 2012/0093119 | A1 * | 4/2012 | Kim et al. | 370/329 |
| 2012/0106477 | A1 * | 5/2012 | Kwon et al. | 370/329 |
| 2012/0307776 | A1 * | 12/2012 | Hong et al. | 370/329 |

FOREIGN PATENT DOCUMENTS

| | | |
|---|---|---|
| KR | 10-2009-0064299 | 6/2009 |
| KR | 10-2009-0086039 | 8/2009 |

OTHER PUBLICATIONS

International Search Report of PCT/KR2010/006941 mailed on Jun. 29, 2011, corresponding to U.S. Appl. No. 12/902,953.
Written Opinion of PCT/KR2010/006941 mailed on Jun. 29, 2011, corresponding to U.S. Appl. No. 12/902,953.

\* cited by examiner

*Primary Examiner* — Tan Trinh
(74) *Attorney, Agent, or Firm* — H.C. Park & Associates, PLC

(57) ABSTRACT

Disclosed are apparatuses and methods for transmitting and receiving control information, such as downlink assignment and uplink grant, to each CC through a DCI format of a PDCCH in a wireless communication system using a plurality of CCs. Exemplary embodiments include configuration and transmission of a CC indicator for the DCI format, in order to identify a CC to which the control information transferred by each DCI format corresponds from among the CCs.

63 Claims, 11 Drawing Sheets

FIG.4
CASE A
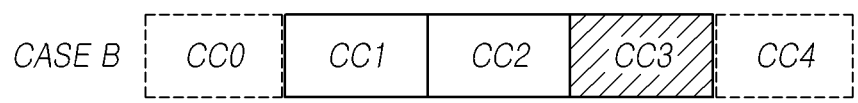
CASE B
 CONFIGURED CC
 NON-CONFIGURED CC
 REFERENCE CC FIG.5
CASE A
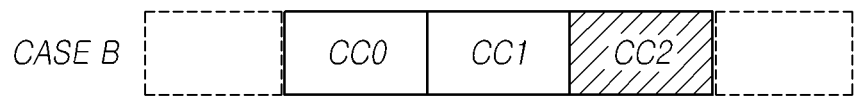
CASE B
☐ CONFIGURED CC
⌐ ┐ NON-CONFIGURED CC
└ ┘
▨ REFERENCE CC FIG.6
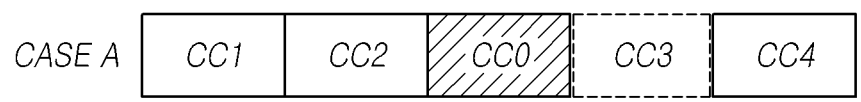
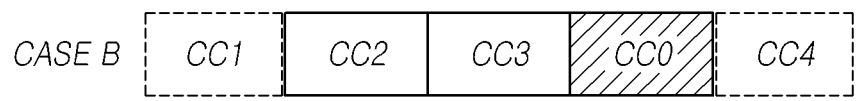

FIG.7
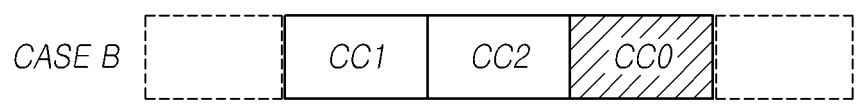
 CONFIGURED CC
 NON-CONFIGURED CC
 REFERENCE CC

APPARATUS AND METHOD FOR TRANSMITTING AND RECEIVING CONTROL INFORMATION IN WIRELESS COMMUNICATION SYSTEM

CROSS-REFERENCE TO RELATED APPLICATION

This application claims priority from and the benefit under 35 U.S.C. §119(a) of Korean Patent Application No. 10-2009-0096983 filed on Oct. 12, 2009 and Korean Patent Application No. 10-2010-0090803 filed on Sep. 15, 2010, which are hereby incorporated by reference for all purposes as if fully set forth herein.

BACKGROUND

1. Field

Embodiments of the present invention relate to an apparatus and a method for transmitting and receiving control information for a Component Carrier (CC) in a wireless communication system.

2. Discussion of the Background

In a wireless communication system, control information, such as information of downlink assignment and uplink grant, is transmitted through a Downlink Control Information (DCI) format of a Physical Downlink Control Channel (PDCCH).

SUMMARY

Exemplary embodiments provide an apparatus and a method for configuring, transmitting, and receiving control information for a base station and a User Equipment (UE) with respect to each Component Carrier (CC) in an efficient and effective manner in a wireless communication system using a plurality of CCs.

Exemplary embodiments provide an apparatus and a method for transmitting control information for a CC in a wireless communication system using a plurality of CCs.

Exemplary embodiments provide an apparatus and a method for transmitting control information for a CC through a Downlink Control Information (DCI) format of a Physical Downlink Control Channel (PDCCH).

Exemplary embodiments provide an apparatus and a method for indicating transmission of control information for a particular CC by using a predetermined length of bits.

Exemplary embodiments provide an apparatus and a method for indicating configuration or non-configuration of control information for a particular CC and the number of configured control information elements by using a predetermined length of bits.

Additional features of the invention will be set forth in the description which follows, and in part will be apparent from the description, or may be learned by practice of the invention.

An exemplary embodiment of the present invention provides a method for transmitting control information in a wireless communication system using two or more Component Carriers (CCs), the method including: generating identification information of 0 bit or m (m is an integer larger than 0) bits indicating a CC to which particular control information corresponds from among the CCs; adding the generated identification information to the particular control information; and transmitting the particular control information through a control channel.

An exemplary embodiment of the present invention provides an apparatus to transmit control information in a wireless communication system using two or more Component Carriers (CCs), the apparatus comprising: a control unit to identify a CC to which particular control information corresponds from among the CCs, to generate identification information of 0 bit or m (m is an integer larger than 0) bits indicating the CC, and to add the generated identification information to the particular control information; and a transmission unit to transmit the particular control information through a control channel.

An exemplary embodiment of the present invention provides a method for receiving control information in a wireless communication system using two or more Component Carriers (CCs), the method comprising: extracting identification information of 0 bit or m (m is an integer larger than 0) bits added to particular control information received through a control channel; and identifying a CC to which the particular control information corresponds from among the CCs by using the identification information of 0 or m bits.

An exemplary embodiment of the present invention provides an apparatus to receive control information in a wireless communication system using two or more Component Carriers (CCs), the apparatus comprising: a demodulation unit to demodulate received modulation symbols to extract particular control information mapped to a control channel; and a control unit to extract identification information of 0 bit or m (m is an integer larger than 0) bits added to the particular control information and to identify a CC to which the particular control information corresponds from among the CCs by using the identification information of 0 bit or m bits.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4 illustrates an example of a method of collectively numbering all CCs regardless of the number and locations of CCs actually configured in a communication and the location of a reference CC according to an exemplary embodiment of the present invention.

FIG. 5 illustrates a method of collectively numbering CCs in consideration of the number of CCs actually configured in a communication regardless of the location of a reference CC according to an exemplary embodiment of the present invention.

FIG. 6 illustrates a method of numbering a reference CC by 0 and then collectively numbering all the other CCs except for the reference CC, regardless of the number and locations of CCs actually configured in a communication, according to an exemplary embodiment of the present invention.

FIG. 7 illustrates a method of numbering a reference CC by 0 and then collectively numbering the other CCs based on the number of CCs actually configured in a communication, according to an exemplary embodiment of the present invention.

DETAILED DESCRIPTION OF THE ILLUSTRATED EMBODIMENTS

Figure 1:
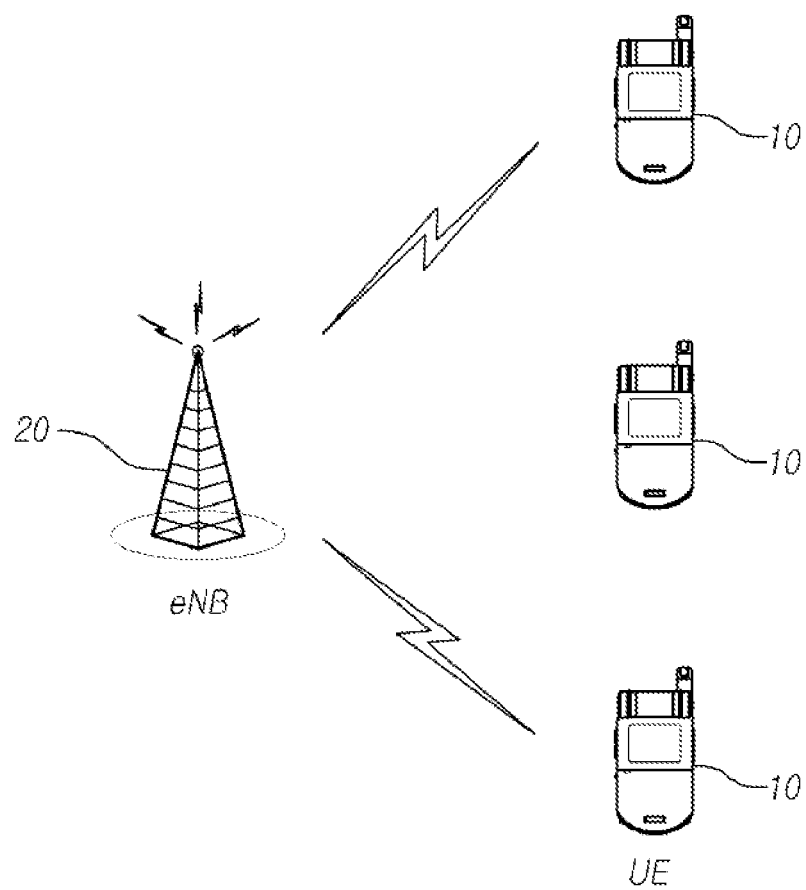
FIG. 1 is a block diagram illustrating a wireless communication system according to an exemplary embodiment of the present invention.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. Various changes, modifications, and equivalents of the systems, apparatuses, and/or methods described herein will likely suggest themselves to those of ordinary skill in the art. Elements, features, and structures are denoted by the same reference numerals throughout the drawings and the detailed description, and the size and proportions of some elements may be exaggerated in the drawings for clarity and convenience.

In addition, terms, such as first, second, A, B, (a), (b), or the like may be used herein when describing components of the present invention. Each of these terminologies is not used to define an essence, order, or sequence of a corresponding component but used merely to distinguish the corresponding component from other component(s). It should be noted that if it is described in the specification that one component is "connected," "coupled," or "joined" to another component, a third component may be "connected," "coupled," or "joined" between the first and second components, although the first component may be directly connected, coupled, or joined to the second component. In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

FIG. 1 is a block diagram illustrating a wireless communication system according to an exemplary embodiment of the present invention. The wireless communication system is widely arranged in order to provide various communication services, such as voice, packet data, etc. Referring to FIG. 1, a wireless communication system includes a UE (User Equipment) 10 and a BS (Base Station) 20.

As used herein, the UE 10 has an inclusive meaning referring to a user terminal in a wireless communication, and should be construed as a concept including not only a UE in WCDMA (Wideband Code Division Multiple Access), LTE (Long Term Evolution), HSPA (High Speed Packet Access), etc., but also an MS (Mobile Station), a UT (User Terminal), SS (Subscriber Station), and a wireless device in GSM (Global System for Mobile Communication).

The Base Station 20 may be a cell and generally refers to a fixed station communicating with the UE 10, and may be described as another name, such as Node-B, eNB (evolved Node-B), BTS (Base Transceiver System), or AP (Access Point).

That is, as used herein, the BS 20 or cell should be construed as having an inclusive meaning indicating an area controlled by a BSC (Base Station Controller) of the CDMA (Code Division Multiple Access), a Node B, etc. of the WCDMA, and may correspond to one of various coverage areas, which include a mega cell, a macro cell, a micro cell, a pico cell, femto cell, etc.

The UE 10 and the BS 20 are not limited to specifically expressed terms or words and inclusively indicate two transmitting and receiving agents used for implementation of the technology or technical idea described herein.

There is no limit in the multiple access schemes applicable to a wireless communication system. That is, various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA, may be applied to the wireless communication system according to aspects of the present invention.

For uplink transmission and downlink transmission, it is possible to use either a TDD (Time Division Duplex) scheme using different times for transmission or an FDD (Frequency Division Duplex) scheme using different frequencies for transmission according to aspects of the present invention.

Embodiments of the present invention may be applied to a resource allocation of an OFDM-based asynchronous wireless communication, which is evolving to LTE (Long Term Evolution) and the LTE-Advanced (LTE-A) through GSM, WCDMA, and HSPA. Aspects of the present invention should not be limited or restrictively construed to a particular wireless communication field, and should be construed to include all technical fields.

The next generation mobile communication systems support a high data rate and data throughput. To this end, various technologies including the Multiple Input Multiple Output (MIMO), CoMP (Cooperative Multiple Point transmission), relay, etc. are being studied, and the most basic and stable solution among the studied technologies is to increase the bandwidth.

However, the current use of frequency resources is nearly saturated, and various technologies are used at most portions of the wide frequency band. Therefore, in order to meet the requirement for such a high data rate and data throughput, "Carrier Aggregation (CA)" has been introduced, which enables each of scattered bands to satisfy basic requirements for an operation of an independent system and to tie multiple bands into one system band. In the concept, each independently operable band is defined as a Component Carrier (CC). By using multiple CCs, a UE 10 or a Base Station (BS) 20 can secure transmission/reception broadband bandwidths in the uplink and the downlink and thus can easily design a system satisfying service requirements of a next generation mobile communication system. Further, a cell for signal transmission and reception of each CC between a BS and a UE is defined as a serving cell. Therefore, multiple serving cells may be defined between a BS and a UE.

All of the CCs may be set to be compatible with the use of only one CC. One CC may refer to one wireless communication band before use of a CA. Each CC may have a maximum of 20 MHz. In an LTE-Advanced system, which is one of the next generation mobile communication systems, five such CCs may be simultaneously used; however, aspects of the present invention are not limited thereto. For example, nine CCs may be simultaneously used.

Since the CC can be used for an independent system operation, a UE 10 can provide a normal mobile communication service even with a minimum of only one CC and simultaneously support the mobile communication service by using multiple CCs.

In a wireless communication system using multiple CCs as described above, in transmitting control information, such as information of downlink assignment and uplink grant, through a Downlink Control Information (DCI) format of a PDCCH by each Component Carrier (CC), the component carrier, to which control information transmitted through each DCI format corresponds, may be identified from among the multiple CCs.

To this end, the DCI format may include an additional bit or additional bits for a Component Carrier Indicator (CC Indicator) or Cell Index (CI) indicating the CC to which the control information corresponds. Also, a method of identifying, by the additional bits, a component carrier, to which control information transmitted through each DCI format corresponds, from among multiple CCs is now emerging. Aspects of the present invention may take a maximum of three bits into account as the additional bits.

Therefore, an exemplary embodiment of the present invention discloses a method of configuring and transmitting a new CC Indicator or CI, wherein each DCI format includes additional bits for the CC Indicator. Also, another exemplary embodiment of the present invention discloses a method of reducing the overhead by reducing the additional bits to a maximum of one bit or two bits according to the configured CC. Further, if control information, such as information of downlink assignment and uplink grant, is transmitted through a CC equal to the CC having the DCI format, the additional bit or bits for the CC Indicator may be omitted in the DCI format, so as to maintain the backward compatibility with an existing system.

Figure 2:
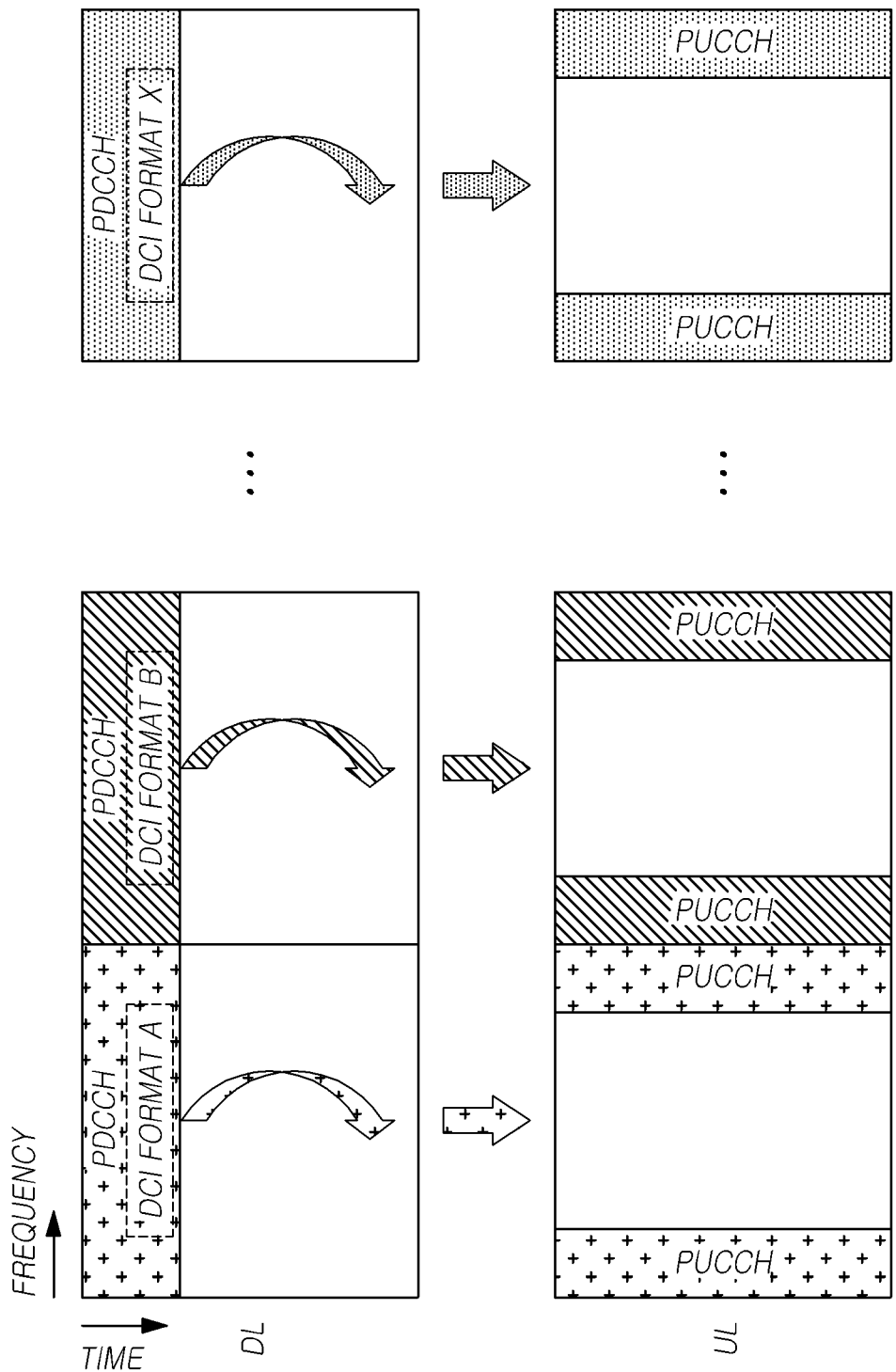
FIG. 2 illustrates transmission of control information, such as information of downlink assignment and uplink grant, for a CC equal to a CC having a DCI format of a PDCCH of each CC in a wireless communication system using multiple CCs according to an exemplary embodiment of the present invention.

FIG. 2 illustrates transmission of control information, such as information of downlink assignment and uplink grant, for a CC equal to a CC having a DCI format of a PDCCH of each CC in a wireless communication system using multiple CCs according to aspects of the present invention.

Referring to FIG. 2, each of multiple CCs transmits resources based on the unit of radio frame, wherein the radio frame includes 10 sub-frames, each of which includes two slots. A time interval taken to transmit one sub-frame is referred to as a Transmission Time Interval (TTI).

For example, one sub-frame may have a length of 1 ms and one slot may have a length of 0.5 ms. The radio frame structure illustrated and described above is only an example, and the number of sub-frames included in a radio frame, the number of slots included in a sub-frame, and/or the number of OFDM symbols included in a slot may be changed in various manners.

One sub-frame includes two consecutive slots. In the case of the downlink, a maximum of first three OFDM symbols of the first slot within a sub-frame correspond to a control region, to which a PDCCH is allocated, and the other symbols correspond to a data region, to which a Physical Downlink Shared Channel (PDSCH) is allocated. The control region may be allocated control channels, such as a Physical Control Format Indicator Channel (PCFICH) and a Physical Hybrid ARQ Indicator Channel (PHICH), as well as the PDCCH. The UE 10 may read data information transmitted through the PDSCH by decoding the control information transmitted through the PDCCH. The control region including three OFDM symbols as described above is only an example, and the number of OFDM symbols included in the control region within a sub-frame can be identified through the PCFICH.

A plurality of PDCCHs multiplexed for a plurality of UEs 10 may be transmitted within the control region. The PDCCH is used to carry DCI, such as scheduling determination and power control command. Specifically, the DCI may include control information, such as downlink scheduling assignment, uplink scheduling grant, and power control command. Since another type of control information as described above corresponds to the size of another DCI message, the DCI may be identified by another DCI format. At this time, the DCI format corresponds to the size and use of the message. The DCI formats may be divided into, for example, six formats including DCI format 0 (UL-SCH assignments), 1 (DL-SCH assignments for SIMO operation), 1A (compact DL-SCH assignments for SIMO operation), 2 (DL-SCH assignments for MIMO operation), 3 (TPC commands for PUCCH and PUSCH with 2-bit power adjustments), and 3A (TPC commands for PUCCH and PUSCH with single bit power adjustments).

One PDCCH carries one message by one of the DCI formats described above. Since multiple UEs 10 can be simultaneously scheduled in the uplink and the downlink, a plurality of scheduling messages may be transmitted within each sub-frame. Since each scheduling message is transmitted on a separate PDCCH, a plurality of PDCCHs may be simultaneously transmitted within each cell.

Referring again to FIG. 2, in a wireless communication system using a plurality of CCs, a DCI format of a PDCCH of each CC may transmit control information, such as downlink assignment and uplink grant, for a CC equal to a CC having a DCI format. A PDCCH for each of the multiple CCs includes a DCI format for transmission of control information of a corresponding CC.

Therefore, a PDCCH of each CC of the downlink is paired with a PDSCH of a downlink CC having a DCI format. Therefore, it is unnecessary to identify a CC, to which control information transferred through each DCI format corresponds, from among the multiple CCs.

The UE 10 can read data information transmitted through a PDSCH of each CC in the downlink by decoding the control information transmitted through a PDCCH of each downlink CC having a DCI format.

Figure 3:
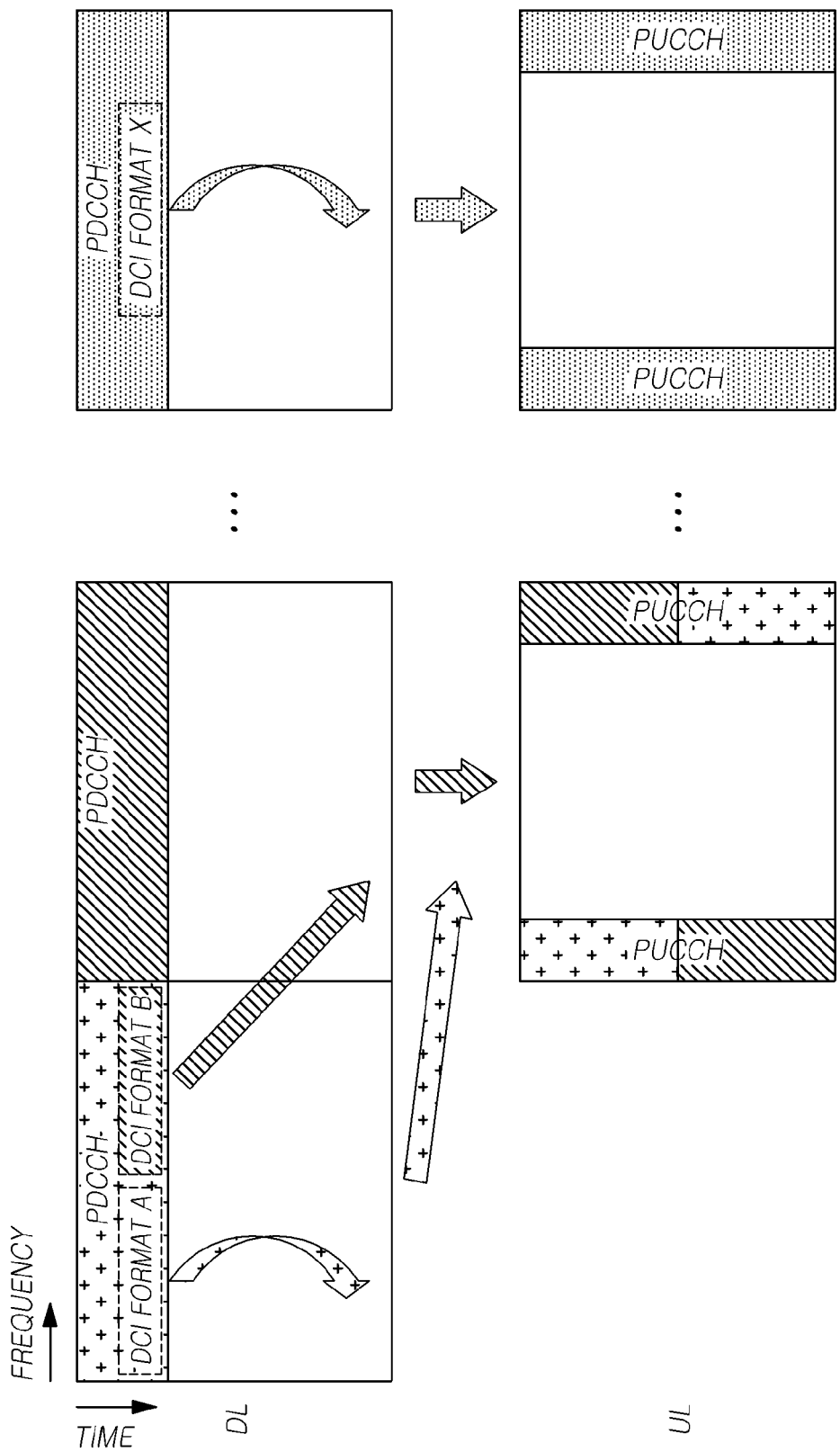
FIG. 3 illustrates a case in which a DCI format of a PDCCH of a particular CC can transmit control information, such as information of downlink assignment and uplink grant, not only for a CC equal to the CC having the DCI format but also for other CCs in a wireless communication system using multiple CCs according to an exemplary embodiment of the present invention is applied.

FIG. 3 illustrates a case in which a DCI format of a PDCCH of a particular CC can transmit control information, such as information of downlink assignment and uplink grant, not only for a CC equal to the CC having the DCI format but also for other CCs in a wireless communication system using multiple CCs according to aspects of the present invention.

Referring to FIG. 3, a particular CC (CC X) may include a DCI format (DCI format X) for transmission of control information of a corresponding CC, while another particular CC (CC O) may include multiple DCI formats (DCI formats A & B) for transmission of control information of multiple CCs including the particular CC (CC O) and another CC (CC 1). Further, a PDCCH of a particular CC may include DCI formats for transmission of control information of all CCs.

If a DCI format of a PDCCH of a particular CC transmits control information, such as information of downlink assignment and uplink grant, not only for a CC equal to the CC having the DCI format but also for one or more other CCs, that is, if a particular CC includes DCI formats for transmission of control information of multiple CCs including the particular CC and one or more other CCs, it is necessary to identify the CC, to which control information transferred by each DCI format corresponds, from among the multiple CCs.

To this end, the DCI format includes additional bit(s) corresponding to a CC Indicator or CI (Cell Index), by which it is possible to identify the CC, to which the control information transferred by each DCI format corresponds, from among the multiple CCs.

In the case of an LTE-Advanced system, which is one of the next generation wireless communication systems, simultaneous use of five CCs having a maximum of 20 MHz bandwidth is taken into consideration; however, aspects of the present invention are not limited thereto. Three bits may be included as the additional bits.

FIG. 4 illustrates an example of a method of collectively numbering all CCs regardless of the number and locations of CCs actually configured in a communication and the location of a reference CC according to an exemplary embodiment of the present invention.

For example, in a system considering five CCs, if the CCs are collectively numbered 0 to 4, it is possible to configure CC Indicators by three additional bits in the DCI format according to the mapping scheme as shown in Table 1 below. At this time, a reference CC is a corresponding CC having a DCI format indicated by a CC Indicator or CI.

TABLE 1

| Additional bit for CC indicator (3 bit) | CC number |
|---|---|
| 000 | CC 0 |
| 001 | CC 1 |
| 010 | CC 2 |
| 011 | CC 3 |
| 100 | CC 4 |
| 101 | Reserved |
| 110 | Reserved |
| 111 | Reserved |

In identifying a CC, to which control information transferred by each DCI format corresponds, from among the CCs by a CC Indicator or CI, a CC having the DCI format may function as a reference CC.

Therefore, although DCI formats may correspond to different reference CCs, each DCI format corresponds to one reference CC (i.e., the reference CC is "DCI format-specific"). Further, a configured CC may be an active CC that actually performs transmission/reception in the uplink/downlink, and may be a CC configured to transmit and receive control information, such as downlink assignment and uplink grant.

As shown in FIG. 4, in a state in which CCs have been collectively numbered regardless of the location of a reference CC and the number and locations of configured CCs, if the CCs are numbered by 0 to 4 in a system considering five CCs, such as an LTE-Advanced system, the CC Indicator or CI can be configured by 0 bit or two additional bits in the DCI format according to a mapping scheme as shown in Table 2, differently from the mapping scheme as shown in Table 1.

TABLE 2

| Additional bit for CC indicator (0 bit or 2 bit) | CC number |
|---|---|
| number of bit = 0 bit | No CC indicator | CC $R_{number}$ |
| number of bits = 2 bit | 00 | CC $\{(R_{number} + 1) \bmod 5\}$ |
| | 01 | CC $\{(R_{number} + 2) \bmod 5\}$ |
| | 10 | CC $\{(R_{number} + 3) \bmod 5\}$ |
| | 11 | CC $\{(R_{number} + 4) \bmod 5\}$ |

In Table 2, 0 bit may correspond to a case of transmitting control information, such as downlink assignment and uplink grant, by a CC equal to the CC having the DCI format. By the 0 bit with no additional bits (no CC Indicator field) for the CC Indicator or CI in the DCI format, it is possible to maintain a backward compatibility with an existing system.

Further, by using two bits to indicate the case in which control information, such as downlink assignment and uplink grant, is transmitted by another CC different from the CC having the DCI format, it is possible to reduce the overhead due to the reduced number of bits (two bits) smaller than the three bits used in the method as shown in Table 1.

At this time, it is possible to determine if the bit length of the CC Indicator or CI is 0 bit or two bits, by identifying the number of bits included as zero padding (the number of bits of "0" added in time series) in the number of all bits of the entire DCI format. For example, a DCI format in which the bit length of the CC Indicator is 0 bit has two more bits of "0" added in time series than a DCI format in which the bit length of the CC Indicator is two bits.

Referring to FIG. 4 and Table 2, $R_{number}$ corresponds to a CC index number of a reference CC. For example, in the Case A in which five CCs including four configured CCs are used and the reference CC is CC 2 ($R_{number}=2$), a DCI format, in which a bit length of a CC Indicator is 0 bit (the DCI format in which a bit length of a CC Indicator is 0 bit has two more bits of "0" added in time series than a DCI format in which a bit length of a CC Indicator is two bits), corresponds to a DCI format for transmitting control information of CC 2 in which the DCI format exists. Further, in the case of the DCI format in which a bit length of a CC Indicator or CI is two bits, the DCI format corresponds to a DCI format for transmission of control information of CC 3 if the bit value is "00", a DCI format for transmission of control information of CC 4 if the bit value is "01", a DCI format for transmission of control information of CC 0 if the bit value is "10", and a DCI format for transmission of control information of CC 1 if the bit value is "11".

In the same way, in the Case B in which five CCs including three configured CCs are used and the reference CC is CC 3 ($R_{number}=3$), a DCI format in which a bit length of a CC Indicator is 0 bit corresponds to a DCI format for transmitting control information of CC 3 in which the DCI format is included. Further, in the case of the DCI format in which a bit length of a CC Indicator or CI is two bits, the DCI format corresponds to a DCI format for transmission of control information of CC 4 if the bit value is "00", a DCI format for transmission of control information of CC 0 if the bit value is "01", a DCI format for transmission of control information of CC 1 if the bit value is "10", and a DCI format for transmission of control information of CC 2 if the bit value is "11".

FIG. 5 illustrates a method of collectively numbering CCs in consideration of the number of CCs actually configured in a communication regardless of the location of a reference CC according to an exemplary embodiment of the present invention.

Referring to FIG. 5, only the configured CCs are collectively numbered, excluding the non-configured CCs. For example, in the Case A of FIG. 5 including four configured CCs, the configured CCs are collectively numbered by CC 0 to CC 3, excluding the non-configured CCs. Further, in the Case B of FIG. 5 including three configured CCs, the configured CCs are collectively numbered by CC 0 to CC 2, excluding the non-configured CCs.

As noted from Table 3, if there is one configured CC, there is no additional bit (0 bit) for the CC Indicator. Further, the CC Indicator or CI may have 0 additional bits or one additional bit if there are two or three configured CCs, and may have 0 or two additional bits if there are four or five configured CCs.

In the CC Indicator or CI constructed as described above, 0 bit corresponds to the case of transmitting control information, such as information of downlink assignment and uplink grant, through a CC equal to the CC having the DCI format, in which the additional bit or bits for the CC Indicator may be omitted (no CC Indicator field) in the DCI format, so as to maintain the backward compatibility with an existing system.

Further, in the case of transmitting control information, such as information of downlink assignment and uplink grant, through a CC different from the CC having the DCI format, one additional bit or two additional bits are used for the CC Indicator according to the number of configured CCs, so as to reduce the bits more than the method of Table 1 using three bits or the case of Table 2 using two bits, thereby further reducing the overhead.

At this time, it is possible to determine if the bit length of the CC Indicator or CI is 0 bit or two bits, by identifying the number of bits included as zero padding (the number of bits of "0" added in time series) in the number of all bits of the entire DCI format. For example, a DCI format in which a bit length of a CC Indicator is 0 bit has two more bits of "0" added in time series than a DCI format in which a bit length of a CC Indicator is two bits, and a DCI format in which a bit length of a CC Indicator is 1 bit has one more bit of "0" added in time series than a DCI format in which a bit length of a CC Indicator is two bits.

TABLE 3

| 1) Number of configured CC: 1 | | |
|---|---|---|
| Additional bit for CC indicator (0 bit) | | CC number |
| number of bit = 0 bit | No CC indicator | CC $R_{number}$ |
| Additional bit for CC indicator (0 bit or 1 bit) | | CC number |
| 2) Number of configured CC: 2 | | |
| number of bit = 0 bit | No CC indicator | CC $R_{number}$ |
| number of bits 1 bit | 0 | CC $\{(R_{number} + 1) \mod 2\}$ |
| | 1 | reserved |
| 3) Number of configured CC: 3 | | |
| number of bit = 0 bit | No CC indicator | CC $R_{number}$ |
| number of bits = 1 bit | 0 | CC $\{(R_{number} + 1) \mod 3\}$ |
| | 1 | CC $\{(R_{number} + 2) \mod 3\}$ |

TABLE 3-continued

| Additional bit for CC indicator (0 bit or 2 bit) | | CC number |
|---|---|---|
| 4) Number of configured CC: 4 | | |
| number of bit = 0 bit | No CC indicator | CC $R_{number}$ |
| number of bits = 2 bits | 00 | CC $\{(R_{number} + 1) \mod 4\}$ |
| | 01 | CC $\{(R_{number} + 2) \mod 4\}$ |
| | 10 | CC $\{(R_{number} + 3) \mod 4\}$ |
| | 11 | reserved |
| 5) Number of configured CC: 5 | | |
| number of bit = 0 bit | No CC indicator | CC $R_{number}$ |
| number of bits = 2 bit | 00 | CC $\{(R_{number} + 1) \mod 5\}$ |
| | 01 | CC $\{(R_{number} + 2) \mod 5\}$ |
| | 10 | CC $\{(R_{number} + 3) \mod 5\}$ |
| | 11 | CC $\{(R_{number} + 4) \mod 5\}$ |

Referring to FIG. 5 and Table 3, $R_{number}$ corresponds to a CC index number of a reference CC. For example, in the Case A in which five CCs including four configured CCs are used and the reference CC is CC 2 ($R_{number}=2$), the bit length of the CC Indicator may be 0 bit or 2 bits. The DCI format, in which a bit length of a CC Indicator is 0 bit, corresponds to a DCI format for transmitting control information of CC 2 in which the DCI format is included. Further, in the case of the DCI format in which a bit length of a CC Indicator is 2 bits, the DCI format corresponds to a DCI format for transmission of control information of CC 3 if the bit value is "00", a DCI format for transmission of control information of CC 0 if the bit value is "01", and a DCI format for transmission of control information of CC 1 if the bit value is "10".

In the same way, in the Case B of FIG. 5 in which five CCs including three configured CCs are used and the reference CC is CC 2 ($R_{number}=2$), the bit length of the CC Indicator may be 0 bit or 1 bit. The DCI format in which a bit length of a CC Indicator is 0 bit corresponds to a DCI format for transmitting control information of CC 2 in which the DCI format is included. Further, in the case of the DCI format in which a bit length of a CC Indicator or CI is 1 bit, the DCI format corresponds to a DCI format for transmission of control information of CC 0 if the bit value is "0", and a DCI format for transmission of control information of CC 1 if the bit value is "1".

As described above, in the case of transmitting control information through a CC equal to the CC having the DCI format, the additional bit or bits for the CC Indicator may be omitted (no CC Indicator field) in the DCI format, so as to maintain the backward compatibility with an existing system. Further, in the case of transmitting control information through a CC different from the CC having the DCI format, one additional bit or two additional bits are used for the CC Indicator according to the number of configured CCs, so as to further reduce the bits of the CC Indicator.

As described above with reference to FIG. 4 and FIG. 5, the reference CC described above corresponds to a CC in which a DCI format including a CC Indicator is included. In identifying a CC, to which control information transferred by each DCI format corresponds, from among the CCs by a CC Indicator or CI, a CC having the DCI format may serve as a reference CC. Therefore, although DCI formats may correspond to different reference CCs, each DCI format corresponds to one reference CC.

However, in another aspect, the reference CC may be an anchor CC. The anchor CC refers to a CC performing the most general and core functions in the process of transmission/reception of a wireless communication system from among a plurality of CCs. In this case, without change of the anchor CC, the reference CC is a single unchanged CC regardless of the CC to which a PDCCH having each DCI format belongs.

A serving cell or a Primary serving cell (PCell) may be the anchor CC described above.

Further, a cell for signal transmission and reception of each CC between a BS and a UE is defined as a serving cell. Therefore, multiple serving cells may be defined between a BS and a UE. Here, a serving cell or a CC having the characteristics as described below is defined as a PCell or a Primary Component Carrier (PCC).

In other words, the PCell has the following attributes.

The cell index of the PCell or the CC Index of the PCC is always 0.

The PCell always includes a pair of downlink (DL) CC and uplink (UL) CC.

UEs can set different CCs as the PCell, respectively.

The PCell is always being activated.

The random access process is performed only through the DL CC and the UL CC of the PCell. However, in the case of MSG4 (contention resolution), only the PDCCH indicating MSG4 should be transmitted through a DL PCC, and the MSG4 information can be transmitted through the DL PCC or a Secondary serving cell (SCell) described below.

The Physical Uplink Control Channel (PUCCH) is transmitted only through the uplink (UL) of the PCell.

The NAS (non-access stratum) information is received through a DL PCC.

Security key information can be transmitted through the PCC.

The Radio Resource Control (RRC) re-establishment is triggered only if a Radio Link Failure (RLF) is detected in the DL PCC or if the number of times by which a random access through the UL PCC has been retried exceeds a maximum limit.

Serving cells other than the PCell can be defined as Secondary serving cells (SCells). A CC configuring the PCell may be referred to as a Primary CC (PCC) while a CC configuring the SCell is referred to as a Secondary CC (SCC); however, aspects of the present invention are not limited thereto.

Further, as used herein, the reference CC may be either an anchor CC or a PCC. However, aspects of the present invention are not limited thereto, and the following description is based on both cases in which the reference CC is an anchor CC and the reference CC is a PCC.

The above discussion deals with a method of collectively numbering CCs including a reference CC. Now, a method of numbering a reference CC by 0 and then collectively numbering the other CCs will be described.

FIG. 6 illustrates a method of numbering a reference CC by 0 and then collectively numbering all the other CCs except for the reference CC, regardless of the number and locations of CCs actually configured in a communication, according to an exemplary embodiment of the present invention.

For example, in the Case A of FIG. 6 including four configured CCs, the reference CC is given a CC index number of 0, and the other CCs are then collectively numbered by CC 1 to CC 4. Further, in the Case B of FIG. 6 including three configured CCs, the reference CC is given a CC index number of 0, and the other CCs are collectively numbered by CC 1 to CC 4. In FIG. 6, since the reference CC is number 0, the index numbers of the other CCs after the reference CC are not sequential from 0.

Here, the CC Indicator or CI can be configured by 0 bit or 2 additional bits in the DCI format according to a mapping scheme as shown in Table 4. In the DCI format, 0 bit may correspond to a case of transmitting control information, such as downlink assignment and uplink grant, by a CC equal to the CC having the DCI format. By the 0 bit with no additional bits (no CC Indicator field) for the CC Indicator or CI in the DCI format, it is possible to maintain a backward compatibility with an existing system.

Further, by using two bits to indicate the case in which control information, such as downlink assignment and uplink grant, is transmitted by another CC different from the CC having the DCI format, it is possible to reduce the overhead due to the reduced number of bits (two bits) smaller than the three bits used in the method as shown in Table 1.

At this time, it is possible to determine if the bit length of the CC Indicator or CI is 0 bit or two bits, by identifying the number of bits included as zero padding (the number of bits of "0" added in time series) in the number of all bits of the entire DCI format. For example, a DCI format in which the bit length of the CC Indicator is 0 bit has two more bits of "0" added in time series than a DCI format in which the bit length of the CC Indicator is two bits.

TABLE 4

| Additional bit for CC indicator (0 bit or 2 bit) | | CC number |
| --- | --- | --- |
| number of bit = 0 bit | No CC indicator | CC 0 |
| number of bits = 2 bit | 00 | CC 1 |
| | 01 | CC 2 |
| | 10 | CC 3 |
| | 11 | CC 4 |

FIG. 7 illustrates a method of numbering a reference CC as 0 and then collectively numbering the other CCs based on the number of CCs actually configured in a communication, according to an exemplary embodiment of the present invention.

Referring to FIG. 7, the reference CC is given a CC index number of 0, and only the configured CCs are then collectively numbered, excluding the non-configured CCs.

For example, in the Case A of FIG. 7 including four configured CCs, the reference CC is first given a CC index number of 0, and the configured CCs are then collectively numbered by CC 1 to CC 3, excluding the non-configured CCs.

Further, in the Case B of FIG. 7 including three configured CCs, the reference CC is first given a CC index number of 0, and the configured CCs are then collectively numbered by CC 1 and CC 2, excluding the non-configured CCs.

As noted from Table 5, if there is one configured CC, there is no addition bit (0 bit) for the CC Indicator. Further, the CC Indicator or CI may have 0 additional bits or one additional bit if there are two or three configured CCs, and may have 0 or two additional bits if there are four or five configured CCs.

In the CC Indicator or CI as described above, 0 bit corresponds to the case of transmitting control information, such as information of downlink assignment and uplink grant, through a CC equal to the CC having the DCI format, in which the additional bit or bits for the CC Indicator may be omitted (no CC Indicator field) in the DCI format, so as to maintain the backward compatibility with an existing system.

Further, in the case of transmitting control information, such as information of downlink assignment and uplink grant, through a CC different from the CC having the DCI format, one additional bit or two additional bits are used for the CC Indicator according to the number of configured CCs, so as to reduce the bits more than the method of Table 1 using three bits or the case of Table 4 using two bits, thereby further reducing the overhead.

At this time, it is possible to determine if the bit length of the CC Indicator or CI is 0 bit or two bits, by identifying the number of bits included as zero padding (the number of bits of "0" added in time series) in the number of all bits of the entire DCI format. For example, a DCI format in which a bit length of a CC Indicator is 0 bit has two more bits of "0" added in time series than a DCI format in which a bit length of a CC Indicator is two bits, and a DCI format in which a bit length of a CC Indicator is 1 bit has one more bit of "0" added in time series than a DCI format in which a bit length of a CC Indicator is two bits.

TABLE 5

| 1) Number of configured CC: 1 | | |
|---|---|---|
| Additional bit for CC indicator (0 bit) | | CC number |
| number of bit = 0 bit | No CC indicator | CC 0 |
| Additional bit for CC indicator (0 bit or 1 bit) | | CC number |
| 2) Number of configured CC: 2 | | |
| number of bit = 0 bit | No CC indicator | CC 0 |
| number of bits = 1 bit | 0 1 | CC 1 reserved |
| 3) Number of configured CC: 3 | | |
| number of bit = 0 bit | No CC indicator | CC 0 |
| number of bits = 1 bit | 0 1 | CC 1 CC 2 |
| Additional bit for CC indicator (0 bit or 2 bit) | | CC number |
| 4) Number of configured CC: 4 | | |
| number of bit = 0 bit | No CC indicator | CC 0 |
| number of bits = 2 bit | 00 01 10 11 | CC 1 CC 2 CC 3 reserved |
| 5) Number of configured CC: 5 | | |
| number of bit = 0 bit | No CC indicator | CC 0 |
| number of bits = 2 bit | 00 01 10 11 | CC 1 CC 2 CC 3 CC 4 |

According to the method of configuring and transmitting a CC Indicator as described above with reference to FIGS. 4 to 7, if control information, such as information of downlink assignment and uplink grant, is transmitted through a CC equal to the CC having the DCI format, the additional bit or bits for the CC Indicator may be omitted in the DCI format, so as to maintain the backward compatibility with an existing system. Further, by reducing the additional bits for the CC Indicator in each DCI format to a maximum of 1 bit or 2 bits, it is possible to reduce the overhead.

In the exemplary embodiments described above with reference to FIG. 4 and FIG. 5, although the description is based on an assumption that the reference CC is the CC including the DCI format having the CC Indicator(s), the reference CC may be an anchor CC or a PCC.

Further, in the exemplary embodiments described above with reference to FIG. 6 and FIG. 7, although the description is based on an assumption that the reference CC is an anchor CC or a PCC, the reference CC may be the CC including the DCI format having the CC Indicator(s).

Meanwhile, in any case, if the reference CC is the CC including the DCI format having the CC Indicator(s), the locations of the CCs including the DCI formats may be different according to the DCI formats, that is, the locations of the reference CCs may be different according to the DCI formats. The CCs may be fixedly numbered regardless of the location of the reference CC as in the exemplary embodiments shown in FIG. 4 and FIG. 5.

Further, if the reference CC is an anchor CC or a PCC, the location of the reference CC is always the same without a change of the anchor CC or PCC. The reference CC may first be given a CC index number of 0 and the other CCs may then be numbered as in the exemplary embodiments shown in FIG. 6 and FIG. 7.

Of course, as well as the CC including a DCI format having a CC Indicator, the anchor CC, the PCC as described above, or any CC, which can be a generally applicable particular reference from among multiple CCs, can be a reference CC. Then, by that reference CC, it is possible to construct and transmit a CC Indicator for a DCI format in a wireless communication system as in the exemplary embodiments described above with reference to FIGS. 4 to 7.

Although the exemplary embodiments described above are based on an assumption that a CC Indicator is included in a DCI format, aspects of the present invention are not limited thereto. For example, the CC Indicator may be included in any channel in a control area of a subframe, which can be divided into the control region and a data region.

In the exemplary embodiments described above, 0 bit or 2 bits of indicator information for identifying a CC, to which particular control information corresponds, from among the CCs is added to the particular control information, which is then allocated to a control channel. At this time, if the bit number of the indicator information is 0 bit, which implies that there is no added indicator information, the particular control information is control information for a particular reference CC. If the bit number of the indicator information is 1 bit or 2 bits, the indicator information indicates that the particular control information is control information for the other CCs except for the particular reference CC. However, aspects of the present invention are not limited thereto and may have various modifications.

For example, in a wireless communication system using two or more CCs, 0 to m (m is a natural number larger than 0) bits of indicator information for identifying a CC, to which particular control information corresponds, from among the CCs are added to the particular control information, which is then allocated to a control channel. At this time, if the bit number of the indicator information is 0 bit, which implies that there is no added indicator information, the particular control information is control information for a particular reference CC. If the bit number of the indicator information is larger than 0 and smaller than or equal to m, the indicator information indicates that the particular control information is control information for the other CCs except for the particular reference CC. Here, m may be either 2 as in the exemplary embodiments described above or smaller or larger than 2.

That is, if m in the m bits includes indicator information for identifying the CC, to which the control information corresponds, is larger than 2, m may have a value of 3. Hereinafter, an example when m is 3 is described.

The following description is based on an assumption that the reference CC is a PCC and the other CCs except for the reference CC are SCCs.

For example, if a maximum of five CCs can be configured between a BS and a UE, the five CCs may include one PCell and four SCells. If a cross carrier scheduling is applied to a corresponding UE and PDCCHs of all serving cells are received through the PCell, the CC Indicator for the DCI may be configured as shown in Table 6 below.

TABLE 6

| Additional bit for CC indicator (0 bit or 2 bit) | | Cell index (CI) |
| --- | --- | --- |
| number of bit = 0 bit | No CC indicator | PCell (CI = 0) |
| number of bits = 2 bit | 00 | SCell (CI = 1) |
| | 01 | SCell (CI = 2) |
| | 10 | SCell (CI = 3) |
| | 11 | SCell (CI = 4) |

Table 6 is actually identical to Table 5.

However, in the identical case, the CC Indicator may be configured by 0 bit or 3 bits as the indicator information as shown in Table 7 below.

TABLE 7

| Additional bit for CC indicator (0 bit or 3 bit) | | Cell index (CI) |
| --- | --- | --- |
| number of bit = 0 bit | No CC indicator | PCell (CI = 0) |
| number of bits = 3 bit | 000 | Reserved |
| | 001 | SCell (CI = 1) |
| | 010 | SCell (CI = 2) |
| | 011 | SCell (CI = 3) |
| | 100 | SCell (CI = 4) |
| | 101 | Reserved |
| | 110 | Reserved |
| | 111 | Reserved |

Further, if a maximum of eight CCs can be configured between a BS and a UE, the eight CCs may include one PCell and seven SCells. If a cross carrier scheduling is applied to a corresponding UE and PDCCHs of all serving cells are received through the PCell, the CC Indicator for the DCI may be configured by 0 or 3 bits as shown in Table 8 below.

TABLE 8

| Additional bit for CC indicator (0 bit or 3 bit) | | Cell index (CI) |
| --- | --- | --- |
| number of bit = 0 bit | No CC indicator | PCell (CI = 0) |
| number of bits = 3 bit | 000 | Reserved |
| | 001 | SCell (CI = 1) |
| | 010 | SCell (CI = 2) |
| | 011 | SCell (CI = 3) |
| | 100 | SCell (CI = 4) |
| | 101 | SCell (CI = 5) |
| | 110 | SCell (CI = 6) |
| | 111 | SCell (CI = 7) |

Further, if a maximum of nine CCs can be configured between a BS and a UE, the nine CCs may include one PCell and eight SCells. If a cross carrier scheduling is applied to a corresponding UE and PDCCHs of all serving cells are received through the PCell, the CC Indicator for the DCI may be configured by 0 or 3 bits as shown in Table 9 below.

TABLE 9

| Additional bit for CC indicator (0 bit or 3 bit) | | Cell index (CI) |
| --- | --- | --- |
| number of bit = 0 bit | No CC indicator | PCell (CI = 0) |
| number of bits = 3 bit | 000 | SCell (CI = 1) |
| | 001 | SCell (CI = 2) |
| | 010 | SCell (CI = 3) |
| | 011 | SCell (CI = 4) |
| | 100 | SCell (CI = 5) |
| | 101 | SCell (CI = 6) |
| | 110 | SCell (CI = 7) |
| | 111 | SCell (CI = 8) |

Here, the mapping between the CI and the CC Indicator in Tables 6 to 9 may be fixedly set between a BS and a UE.

Further, information of the mapping between the CI and the CC Indicator in Tables 6 to 9 can be transmitted through a broadcasting channel to and thus be commonly applied to all the UEs receiving a service from the BS. Also, through an L3 (RRC) message, the mapping information can be either commonly applied to all the UEs or individually applied to each UE.

For example, a UE capable of configuring a maximum of five CCs can receive indicator information of 0 or 2 bits according to Table 6 or CC indicator information of 0 or 3 bits according to Table 7 through an RRC message, and a UE capable of configuring a maximum of eight CCs can receive CC indicator information of 0 or 3 bits according to Table 8 through an RRC message. Further, a UE capable of configuring a maximum of nine CCs can receive CC indicator information of 0 or 3 bits according to Table 9 through an RRC message.

Otherwise, if there are UEs capable of configuring a maximum of five CCs, some UEs can receive information as shown in Table 7 while the other UEs can receive information as shown in Table 10 below.

TABLE 10

| Additional bit for CC indicator (0 bit or 3 bit) | | Cell index (CI) |
| --- | --- | --- |
| number of bit = 0 bit | No CC indicator | PCell (CI = 0) |
| number of bits = 3 bit | 000 | SCell (CI = 1) |
| | 001 | SCell (CI = 2) |
| | 010 | SCell (CI = 3) |
| | 011 | SCell (CI = 4) |
| | 100 | Reserved |
| | 101 | Reserved |
| | 110 | Reserved |
| | 111 | Reserved |

Figure 8:
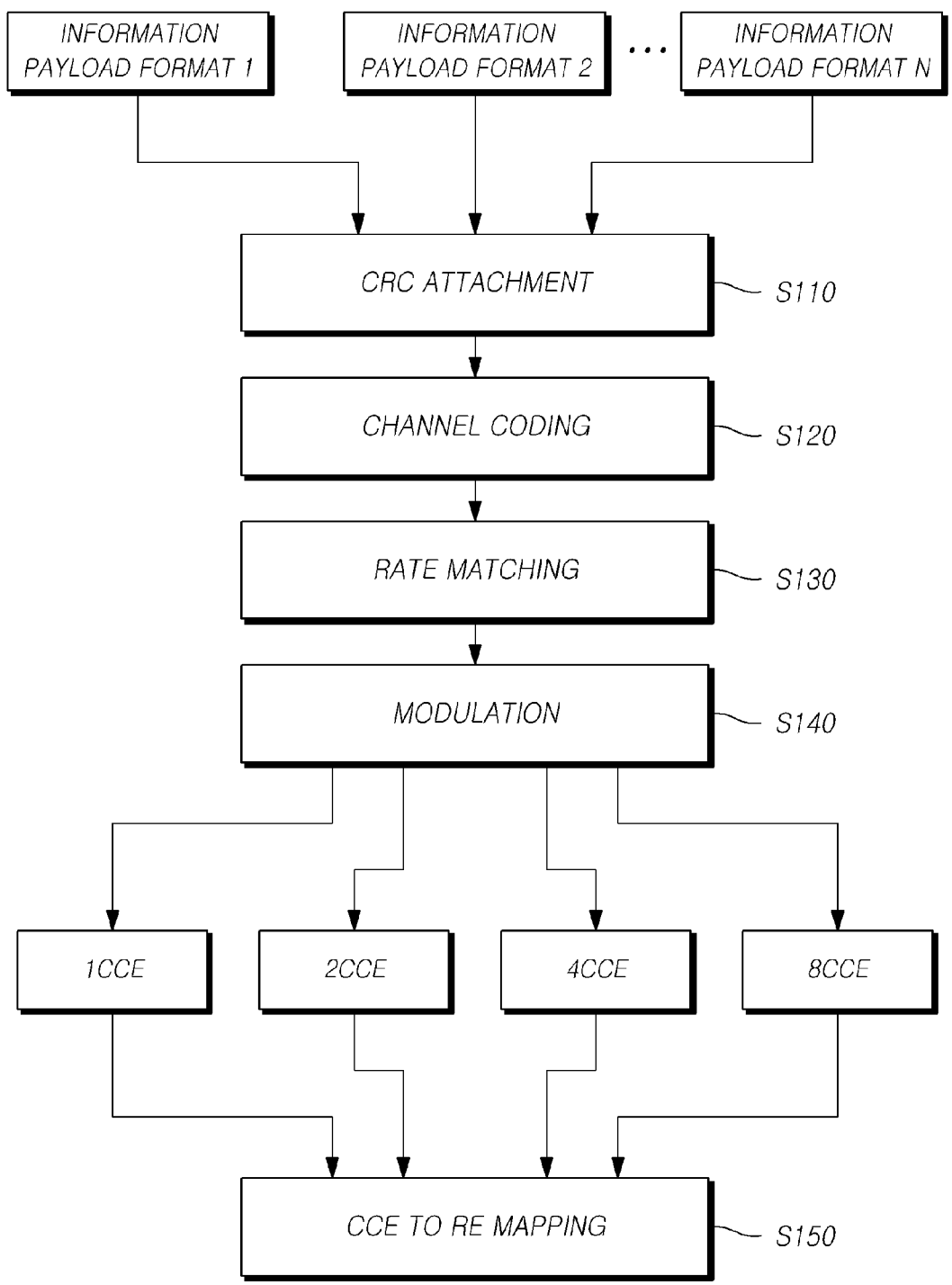
FIG. 8 illustrates a method of configuring a PDCCH according to an exemplary embodiment of the present invention.

FIG. 8 illustrates a method of configuring a PDCCH according to an exemplary embodiment of the present invention.

Referring to FIG. 8, a BS (and a scheduler) configures a PDCCH payload according to an information payload format to be transmitted to a UE. The PDCCH payload may have various lengths according to the information payload format. The information payload format may be a DCI format.

In a wireless communication system including a plurality of CCs, if the information payload format is a DCI format, a particular CC (CC X) may include a DCI format (DCI format X) for transmission of control information of the particular CC, and another particular CC (CC 0) may include DCI formats (DCI format A & B) for transmission of control information of multiple CCs including the particular CC (CC 0) and other CCs (e.g., CC 1). Further, a PDCCH of a particular CC may include all the DCI formats for transmission of control information of all CCs.

In order to identify a CC, to which control information transferred by each DCI format corresponds, from among CCs, the DCI format may include no CC Indicator as described above with reference to FIGS. 4 to 7 or a CC Indicator of 1 bit, 2 bits, or 3 bits as described above with reference to Tables 7 to 10.

In zero padding by adding bits of "0" in time series to the bits of the entire DCI format, the number of added bits of "0" is determined to be different according to the bit length of the CC Indicator, which is 0 bit, 1 bit, or 3 bits.

In operation S110, a Cyclic Redundancy Check (CRC) for error detection is added to each PDCCH payload. The CRC may be masked with identification information (for example, a Radio Network Temporary Identifier (RNTI)) allocated according to a use set in order to provide a service between a UE and a BS or specific information of a UE to which the PDCCH is transmitted.

In operation S120, the control information with the added CRC is channel-coded to generate coded data.

In operation S130, a rate matching according to a Control Channel Element (CCE) group level allocated to the PDCCH format is performed.

In operation S140, the coded data is modulated to generate modulation symbols. In operation S150, the modulation symbols are mapped to physical Resource Elements (CCE-to-RE mapping). The CCE level may be repeatedly transmitted according to the importance of the transmitted control information.

Figure 9:
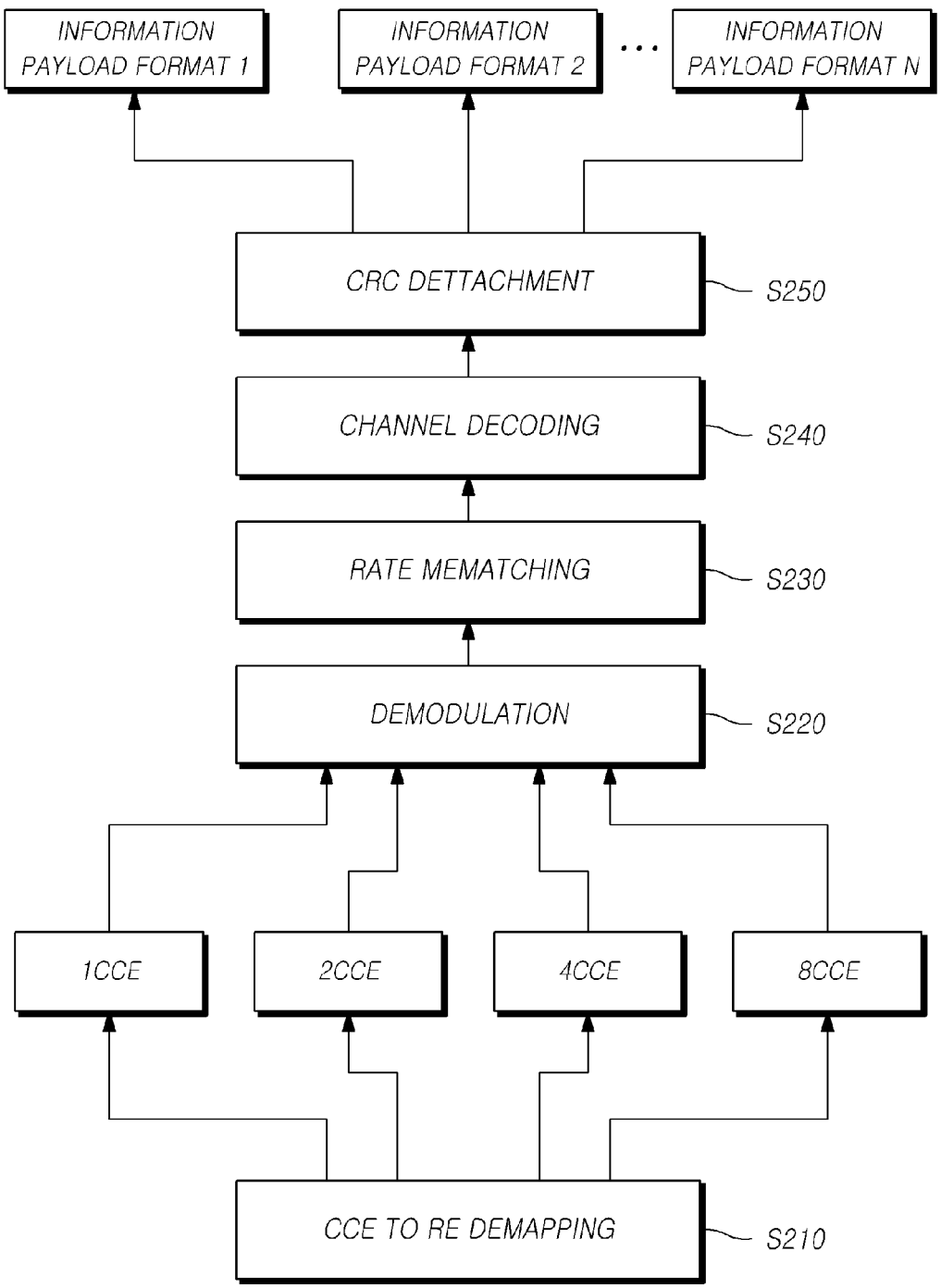
FIG. 9 is a flowchart illustrating a method of processing a PDCCH according to an exemplary embodiment of the present invention.

FIG. 9 is a flowchart illustrating a method of processing a PDCCH according to an exemplary embodiment of the present invention.

Referring to FIG. 9, in operation S210, a UE 10 should de-map a physical Resource Element (RE) to a CCE (RE-to-CCE de-mapping). In operation S220, since the UE 10 does not know the CCE group level, at which the UE 10 should receive the PDCCH, the UE 10 demodulates a CCE group level, which a payload corresponding to a reference DCI format according to the transmission mode of the UE 10 can have.

In operation S230, the UE 10 performs a rate de-matching of the demodulated data according to the CCE group level and the corresponding payload.

In operation S240, the UE 10 channel-decodes the coded data according to a coding rate and performs a CRC check so as to detect occurrence of an error. If no error has occurred, it implies that the UE 10 has detected its own PDCCH. If an error has occurred, the UE 10 keeps on performing a blind decoding for another CCE group level or another DCI format.

In operation S250, the UE 10 having detected its own PDCCH removes the CRC from the decoded data, thereby acquiring control information necessary for the UE 10. Then, the UE 10 identifies an indicator (index) of a Component Carrier (CC) included in the control information, thereby identifying the CC to which this control information corresponds from among multiple CCs.

At this time, the UE 10 can determine if the bit length of the CC Indicator is 0 bit, 1 bit, 2 bits, or 3 bits as described with reference to Tables 7 to 10 by identifying the number of bits included as zero padding (the number of bits of "0" added in time series) in the number of bits of the entire DCI format. For example, the DCI format in which the bit length of the CC Indicator is 0 bit has three more bits, two more bits, and one more bit of "0" added in time series than the DCI formats in which the bit length of the CC Indicator is three bits, two bits, and one bit, respectively.

By using the downlink scheduling assignment, uplink scheduling grant, and power control command included in this control information, it is possible to perform functions of the downlink scheduling assignment, uplink scheduling grant, and power control of a CC identified by the CC indicator.

Although the above description of the exemplary embodiments of the present invention refers to the accompanying drawings, aspects of the present invention are not limited thereto.

Figure 10:
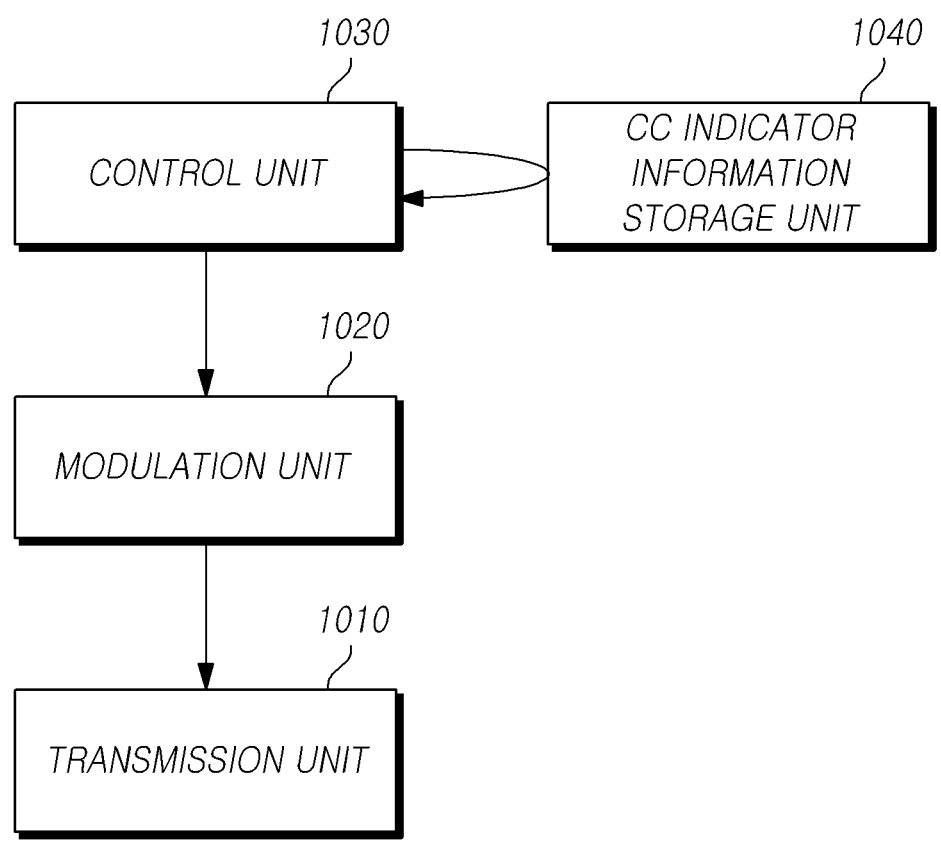
FIG. 10 is a block diagram illustrating a structure of an apparatus for allocating and transmitting control information according to an exemplary embodiment of the present invention.

FIG. 10 is a block diagram illustrating a structure of an apparatus for allocating and transmitting control information according to an exemplary embodiment of the present invention.

The apparatus shown in FIG. 10 may be a BS, a cell, or an apparatus connected to a BS. The apparatus includes a transmission unit 1010, a modulation unit 1020, and a control unit 1030, and may further include a CC indicator information storage unit 1040.

Referring to FIG. 10, the control unit 1030 identifies a CC to which particular control information corresponds from among multiple CCs, and generates and adds 0 bit or m bits (m is an integer larger than 0) of identification information, which indicates the CC to the particular control information. Further, the modulation unit 1020 modulates the particular control information into a modulation symbol so that the modulation symbol can be mapped to a control channel, and the transmission unit 1010 transmits the modulation symbol to the UE. The operations, etc., related to the control unit 1030 are similar to those described above with reference to FIG. 8.

The transmission apparatus shown in FIG. 10 may further include the CC indicator information storage unit 1040 to store mapping information between the CC indicator information and at least one of the CCs described with reference to Tables 1 to 10 in order to enable the control unit 1030 to add the identification information to the particular control information. That is, the CC indicator information storage unit 1040 stores the bit length of the identification information or information on the CC indicated by the identification information.

The identification information may indicate different CCs according to the length or value (contents) of the identification information. If the identification information has a length of 0 or m (m is an integer larger than 0) bits, it is possible to identify the number of bits newly zero-padded in the process of adding the identification information to the particular control information.

Further, according to an exemplary embodiment of the present invention, the control channel may be a PDCCH, the particular control information may be configured in the DCI format, and the identification information may be allocated to the PDCCH as additional bits to the DCI format. Also, the particular reference CC may be the CC including the control channel to which the identification information is allocated, an anchor CC, or a PCC.

The control unit 1030 may allocate different identification information according to the CC identified by the particular control information. For example, if the particular control information is identified as control information for a particular reference CC among the CCs, the control unit 1030 may add the identification information of 0 bit to the particular control information. In contrast, if the particular control information is identified as control information for a CC other than the particular reference CC among the CCs, the control unit

1030 may add the identification information with a size larger than 0 bit and smaller than m bits to the particular control information.

The relation between identification information and a component carrier will now be discussed in detail. That is, if m is 2 and the bit number of the identification information is 1 bit or 2 bits, the identification information indicates that the particular control information is control information for a CC other than the particular reference CC among the CCs.

Further, if the bit number of the identification information is 2 bits, in a state in which the particular reference CC is given a CC index number of 0 and all the other CCs except for the reference CC are then collectively numbered regardless of the number and locations of configured CCs, the identification information indicates that the control information is control information for a CC having a CC index number of 1, 2, 3, and 4 if the bit value of the identification information is "00", "01", "10", and "11", respectively.

Meanwhile, only the configured CCs are collectively numbered excluding the non-configured CCs. If the number of the configured CCs is two or three, the identification information may have a length of 0 bit or 1 bit. Further, if the number of the configured CCs is four or five, the identification information may have a length of 0 bit or 2 bits, wherein setting of 0 bit indicates that the configured CC corresponds to the PCell. Further, setting of 2 bits indicates that the four CCs correspond to the SCell.

Further, if m is 3 and the bit number of the identification information is 3 bits, the identification information indicates that the particular control information is control information for another CC except for the particular reference CC from among the CCs. At this time, the identification information corresponds to identification information for CCs corresponding to the eight SCells, and each corresponding identification information element indicates a cell index of a corresponding SCell.

According to an exemplary embodiment of the present invention, the particular reference CC may correspond to a PCC, which is a CC configuring the PCell, and the other CCs except for the particular reference CC may be SCCs, which configure Secondary serving cells (SCells).

Figure 11:
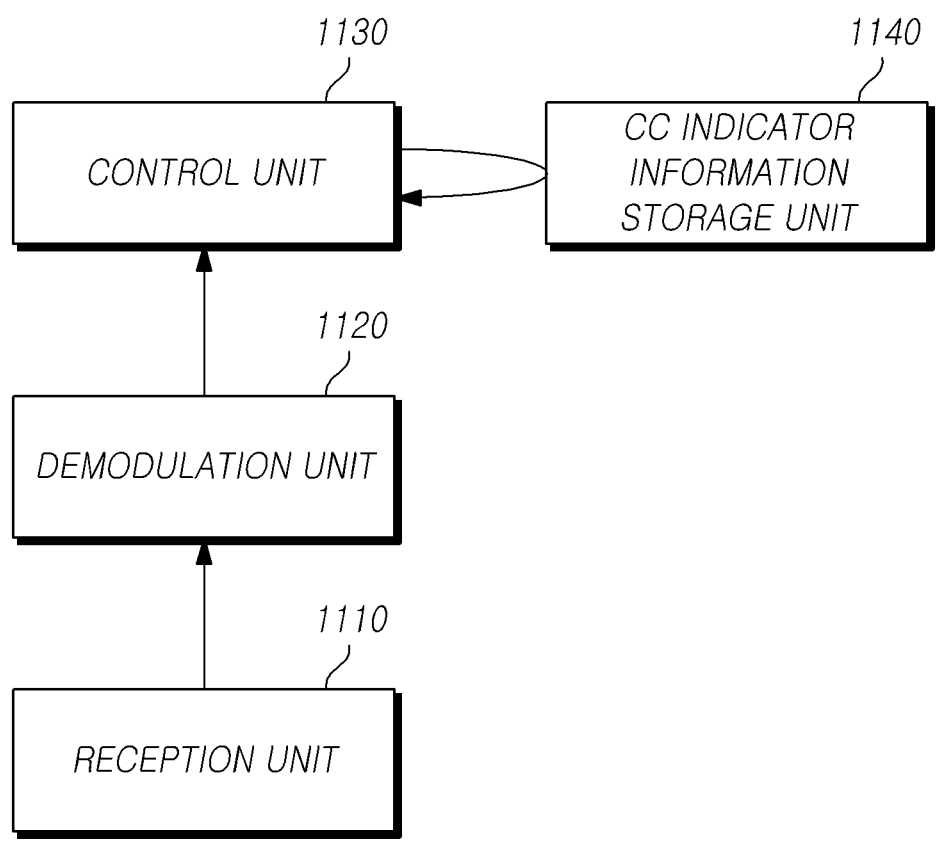
FIG. 11 is a block diagram illustrating a structure of an apparatus for receiving control information according to an exemplary embodiment of the present invention.

FIG. 11 is a block diagram illustrating a structure of an apparatus for receiving control information according to an exemplary embodiment of the present invention.

The apparatus shown in FIG. 11 may be a UE or an apparatus connected to a UE. The apparatus includes a reception unit 1110, a demodulation unit 1120, and a control unit 1130, and may further include a CC indicator information storage unit 1140.

Referring to FIG. 11, the reception unit 1110 receives modulation symbols from a BS or cell, and the demodulation unit 1120 extracts particular control information mapped to a control channel by demodulating the modulation symbols. Further, the control unit 1130 extracts identification information of 0 to m (m is an integer larger than 0) bits indicating a CC from the particular control information, so as to identify the CC to which the particular control information corresponds, from among the CCs. The operations, etc., related to the demodulation of the modulation symbols is similar to those described above with reference to FIG. 9. Further, the reception apparatus shown in FIG. 11 may further include the CC indicator information storage unit 1140 to store mapping information between the CC indicator information and at least one of the CCs described with reference to Tables 1 to 10 in order to enable the control unit 1130 to extract the identification information and identify the CC to which the particular control information corresponds from among the CCs.

That is, the CC indicator information storage unit 1140 stores the bit length of the identification information or information on the CC indicated by the identification information.

The identification information may indicate different CCs according to the length or value (contents) of the identification information. If the identification information has a length of 0 or m (m is an integer larger than 0) bits, it is possible to identify the number of bits newly zero-padded in the process of adding the identification information to the particular control information. Further, according to an exemplary embodiment of the present invention, the control channel may be a PDCCH, the particular control information may be configured in the DCI format, and the identification information may be allocated to the PDCCH as additional bits to the DCI format. Also, the particular reference CC may be the CC including the control channel to which the identification information is allocated, an anchor CC, or a PCC.

The control unit 1130 may allocate different identification information according to the CC identified by the particular control information.

That is, if the bit number of the identification information extracted by the control unit 1130 is 0 bit, the control unit 1130 determines that there is no added identification information and the particular control information corresponds to control information for a particular reference CC from among the CCs. Meanwhile, if the bit number of the identification information is larger than 0 and smaller than m, the control unit 1130 determines that the particular control information corresponds to control information for another CC other than the particular reference CC from among the CCs. At this time, the control unit 1130 identifies the set CC by identifying the bit number of the extracted identification information. That is, if the set bits are 0, the control unit 1130 identifies that there is no set SCell and only the PCell exists. For example, if the bit number is 3, it is identified that CCs corresponding to 8 SCells exist. At this time, a value defined by three bits indicates a cell index of each corresponding SCell transmitting control information.

More specifically, if m is 2 and the bit number of the identification information is 1 bit or 2 bits, the identification information indicates that the particular control information is control information for a CC other than the particular reference CC among the CCs. At this time, the identification information is identification information for CCs corresponding to four SCells, and each corresponding identification information element indicates a cell index of a corresponding SCell.

Further, if the bit number of the identification information is 2 bits, in a state in which the particular reference CC is given a CC index number of 0 and all the other CCs except for the reference CC are then collectively numbered regardless of the number and locations of configured CCs, the identification information indicates that the control information is control information for a CC having a CC index number of 1, 2, 3, and 4 if the bit value of the identification information is "00", "01", "10", and "11", respectively.

Here, only the configured CCs are collectively numbered excluding the non-configured CCs. If the number of the configured CCs is two or three, the identification information may have a length of 0 bit or 1 bit. Further, if the number of the configured CCs is four or five, the identification information may have a length of 0 bit or 2 bits, wherein a setting of 0 bit indicates that the configured CC corresponds to the PCell. Further, a setting of 2 bits indicates that four CCs correspond to the SCell.

Further, if m is 3 and the bit number of the identification information is 3 bits, the identification information indicates that the particular control information is control information for another CC except for the particular reference CC from among the CCs. At this time, the identification information corresponds to identification information for CCs corresponding to the eight SCells, and each corresponding identification information element indicates a cell index of a corresponding SCell. Further, the particular reference CC may correspond to a PCC, which is a CC configuring the PCell, and the other CCs except for the particular reference CC may be SCCs which configure Secondary serving cells (SCells).

While the exemplary embodiments have been shown and described, it will be understood by those skilled in the art that various changes in form and details may be made thereto without departing from the spirit and scope of this disclosure as defined by the appended claims and their equivalents. Thus, it is intended that the present invention cover the modifications and variations of this invention provided they come within the scope of the appended claims and their equivalents.

What is claimed is:

1. A method for transmitting control information in a wireless communication system using two or more Component Carriers (CCs), the method comprising:
    generating identification information of 0 bit or m (m is an integer larger than 0) bits indicating a CC to which particular control information corresponds from among the CCs;
    adding the generated identification information to the particular control information; and
    transmitting the particular control information through a control channel,
    wherein generating of the identification information comprises:
        setting a bit number of the identification information to 0 bit to indicate that no identification information has been added to the particular control information or to m bits to indicate that the particular control information includes added identification information,
    wherein the identification information of 0 bit indicates that the particular control information is control information for a particular reference CC from among the CCs, and
    wherein the identification information of m bits indicates that the particular control information is control information for at least one CC other than a particular reference CC from among the CCs.

2. The method of claim 1, wherein, if the bit number of the identification information is one bit, the identification information indicates that the particular control information is control information for two or fewer CCs other than the particular reference CC from among the CCs.

3. The method of claim 1, wherein, if the bit number of the identification information is two bits, the identification information indicates that the particular control information is control information for four or fewer CCs other than the particular reference CC from among the CCs.

4. The method of claim 3, further comprising:
    mapping a CC indicator of the identification information for the particular reference CC to 0; and
    mapping a CC indicator of the identification information for four or fewer CCs other than the particular reference CC to at least one of 1, 2, 3, and 4 by using the two bits.

5. The method of claim 1, wherein, if the bit number of the identification information is three bits, the identification information indicates that the particular control information is control information for eight or fewer CCs other than the particular reference CC from among the CCs.

6. The method of claim 5, further comprising:
    mapping a CC indicator of the identification information for the particular reference CC to 0; and
    mapping a CC indicator of the identification information for eight or fewer CCs other than the particular reference CC to at least one of 1, 2, 3, 4, 5, 6, 7, and 8 by using the three bits.

7. The method of claim 1, wherein the particular reference CC comprises a Primary Component Carrier (PCC), which is a CC configuring a Primary serving cell (PCell).

8. The method of claim 7, further comprising:
    mapping a cell index of identification information for the PCell to 0; and
    mapping a cell index of identification information for four or fewer Secondary serving cells (SCells) other than the PCell to at least one of 1, 2, 3, and 4 by using two bits.

9. The method of claim 8, further comprising:
    transmitting information of mapping between the cell indexes of the identification information for the PCell and the SCells, the identification information indicating the CCs configuring the PCell and the SCells through a broadcast channel.

10. The method of claim 9, further comprising transmitting information of mapping between the cell indexes of the identification information for the PCell and the SCells and the identification information indicating the CCs configuring the PCell and the SCells through a Radio Resource Control (RRC) message.

11. The method of claim 7, further comprising:
    mapping a cell index of identification information for the PCell to 0; and
    mapping a cell index of identification information for eight or fewer Secondary serving cells (SCells) other than the PCell to at least one of 1, 2, 3, 4, 5, 6, 7, and 8 by using three bits.

12. The method of claim 11, further comprising:
    transmitting information of mapping between the cell indexes of the identification information for the PCell and the SCells, the identification information indicating the CCs configuring the PCell and the SCells through a broadcast channel.

13. The method of claim 12, further comprising transmitting information of mapping between the cell indexes of the identification information for the PCell and the SCells and the identification information indicating the CCs configuring the PCell and the SCells through a Radio Resource Control (RRC) message.

14. The method of claim 1, wherein another CC other than the particular reference CC comprises a Secondary Component Carrier (SCC), which is a CC configuring a Secondary serving cell (SCell).

15. The method of claim 1, wherein the identification information is configured as additional bits in a Downlink Control Information (DCI) format and is transmitted through a Physical Downlink Control Channel (PDCCH).

16. The method of claim 15, wherein the identification information is transmitted through one of an anchor CC or the particular reference CC including the PDCCH.

17. An apparatus to transmit control information in a wireless communication system using two or more Component Carriers (CCs), the apparatus comprising:
    a control unit to identify a CC to which particular control information corresponds from among the CCs, to generate identification information of 0 bit or m (m is an integer larger than 0) bits indicating the CC, and to add the generated identification information to the particular control information; and a transmission unit to transmit the particular control information through a control channel, wherein, if the control unit identifies that the particular control information is control information for a particular reference CC from among the CCs, the control unit sets a bit number of the identification information to 0 bit to indicate that no identification information has been added to the particular control information, and wherein, if the control unit identifies that the particular control information is control information for another CC other than a particular reference CC from among the CCs, the control unit sets the bit number of the identification information to m bits to indicate that the particular control information includes added identification information.

18. The apparatus of claim 17, wherein the control unit identifies that the particular control information is control information for two or fewer CCs other than the particular reference CC from among the CCs, and sets the bit number of the identification information to one bit.

19. The apparatus of claim 17, wherein the control unit identifies that the particular control information is control information for four or fewer CCs other than the particular reference CC from among the CCs, and sets the bit number of the identification information to two bits.

20. The apparatus of claim 19, wherein the control unit maps a CC indicator of the identification information for the particular reference CC to 0, and maps a CC indicator of the identification information for four or fewer CCs other than the particular reference CC to at least one of 1, 2, 3, and 4 by using the two bits.

21. The apparatus of claim 17, wherein the control unit identifies that the particular control information is control information for eight or fewer CCs other than the particular reference CC from among the CCs, and sets the bit number of the identification information to three bits.

22. The apparatus of claim 21, wherein the control unit maps a CC indicator of the identification information for the particular reference CC to 0, and maps a CC indicator of the identification information for eight or fewer CCs other than the particular reference CC to at least one of 1, 2, 3, 4, 5, 6, 7, and 8 by using the three bits.

23. The apparatus of claim 17, wherein the particular reference CC comprises a Primary Component Carrier (PCC), which is a CC to configure a Primary serving cell (PCell).

24. The apparatus of claim 23, wherein the control unit maps a cell index of identification information for a PCell to 0, and maps a cell index of identification information for four or fewer Secondary serving cells (SCells) other than the PCell to at least one of 1, 2, 3, and 4 by using the two bits.

25. The apparatus of claim 23, wherein the control unit maps a cell index of identification information for a PCell to 0, and maps a cell index of identification information for eight or fewer Secondary serving cells (SCells) other than the PCell to at least one of 1, 2, 3, 4, 5, 6, 7, and 8 by using the three bits.

26. The apparatus of claim 17, wherein another CC other than the particular reference CC comprises a Secondary Component Carrier (SCC), which is a CC to configure a Secondary serving cell (SCell).

27. The apparatus of claim 17, wherein the transmission unit of the apparatus transmits information of mapping between the cell indexes of the identification information for a Primary serving cell (PCell) and Secondary serving cells (SCells) and the identification information indicating the CCs configuring the PCell and the SCells through a broadcast channel.

28. The apparatus of claim 17, wherein the transmission unit of the apparatus transmits information of mapping between the cell indexes of the identification information for a Primary serving cell (PCell) and Secondary serving cells (SCells) the identification information indicating the CCs configuring the PCell and the SCells through a Radio Resource Control (RRC) message.

29. The apparatus of claim 17, wherein the transmission unit of the apparatus transmits the identification information, which is generated by the control unit and is configured as additional bits in a Downlink Control Information (DCI) format, through a Physical Downlink Control Channel (PDCCH).

30. The apparatus of claim 17, wherein the transmission unit of the apparatus transmits the identification information, which is generated by the control unit, through one of an anchor CC or the particular reference CC including a PDCCH.

31. The apparatus of claim 17, further comprising a CC indicator information storage unit to store a CC indicated by the identification information or a bit length of the identification information.

32. A method for receiving control information in a wireless communication system using two or more Component Carriers (CCs), the method comprising:

extracting identification information of 0 bit or m (m is an integer larger than 0) bits added to particular control information received through a control channel; and identifying a CC to which the particular control information corresponds from among the CCs by using the identification information of 0 or m bits, wherein the extracting of the identification information comprises:

identifying the identification information of 0 or m bits;

if the identification information is identified as 0 bit, identifying through the identification information of 0 bit that no identification information has been added to the particular control information; and identifying that the particular control information is control information for a particular reference CC from among the CCs, and if the identification information is identified as m bits, identifying through the identification information of m bits that the particular control information includes the added identification information; and identifying that the particular control information is control information for at least one CC other than a particular reference CC from among the CCs.

33. The method of claim 32, wherein, if the bit number of the identification information is one bit, the identification information indicates that the particular control information is control information for two or fewer CCs other than the particular reference CC from among the CCs.

34. The method of claim 32, wherein, if the bit number of the identification information is two bits, the identification information indicates that the particular control information is control information for four or fewer CCs other than the particular reference CC from among the CCs.

35. The method of claim 34, further comprising:

identifying that a CC indicator of the identification information for the particular reference CC is mapped to 0; and identifying that a CC indicator of the identification information for four or fewer CCs other than the particular reference CC is mapped to at least one of 1, 2, 3, and 4 by using the two bits.

36. The method of claim 32, wherein, if the bit number of the identification information is three bits, the identification information indicates that the particular control information is control information for eight or fewer CCs other than the particular reference CC from among the CCs.

37. The method of claim 36, further comprising:
identifying that a CC indicator of the identification information for the particular reference CC is mapped to 0; and
identifying that a CC indicator of the identification information for eight or fewer CCs other than the particular reference CC is mapped to at least one of 1, 2, 3, 4, 5, 6, 7, and 8 by using the three bits.

38. The method of claim 32, wherein the particular reference CC comprises a Primary Component Carrier (PCC), which is a CC configuring a Primary serving cell (PCell).

39. The method of claim 38, further comprising:
identifying that a cell index of identification information for the PCell is mapped to 0; and
identifying that a cell index of identification information for four or fewer Secondary serving cells (SCells) other than the PCell is mapped to at least one of 1, 2, 3, and 4 by using two bits.

40. The method of claim 39, further comprising:
receiving information of mapping between the cell indexes of the identification information for the PCell and the SCells, the identification information indicating the CCs configuring the PCell and the SCells through a broadcast channel.

41. The method of claim 40, further comprising:
receiving information of mapping between the cell indexes of the identification information for the PCell and the SCells and the identification information indicating the CCs configuring the PCell and the SCells through a Radio Resource Control (RRC) message.

42. The method of claim 38, further comprising:
identifying that a cell index of identification information for the PCell is mapped to 0; and
identifying that a cell index of identification information for eight or fewer Secondary serving cells (SCells) other than the PCell is mapped to at least one of 1, 2, 3, 4, 5, 6, 7, and 8 by using three bits.

43. The method of claim 42, further comprising:
receiving information of mapping between the cell indexes of the identification information for the PCell and the SCells, the identification information indicating the CCs configuring the PCell and the SCells through a broadcast channel.

44. The method of claim 43, further comprising:
receiving information of mapping between the cell indexes of the identification information for the PCell and the SCells and the identification information indicating the CCs configuring the PCell and the SCells through a Radio Resource Control (RRC) message.

45. The method of claim 32, wherein another CC other than the particular reference CC comprises a Secondary Component Carrier (SCC), which is a CC configuring a Secondary serving cell (SCell).

46. The method of claim 32, further comprising:
receiving a Physical Downlink Control Channel (PDCCH); and
extracting the identification information configured as additional bits in a Downlink Control Information (DCI) format of the PDCCH.

47. The method of claim 46, wherein the identification information is received through one of an anchor CC or the particular reference CC including the PDCCH.

48. An apparatus to receive control information in a wireless communication system using two or more Component Carriers (CCs), the apparatus comprising:
a demodulation unit to demodulate received modulation symbols to extract particular control information mapped to a control channel; and
a control unit to extract identification information of 0 bit or m (m is an integer larger than 0) bits added to the particular control information and to identify a CC to which the particular control information corresponds from among the CCs by using the identification information of 0 bit or m bits,
wherein, if the control unit identifies the identification information of 0 bit, the control unit identifies through the identification information of 0 bit that no identification information has been added to the particular control information, and identifies that the particular control information is control information for a particular reference CC from among the CCs, and
wherein, if the control unit identifies the identification information of m bits, the control unit identifies through the identification information of m bits that the particular control information includes added identification information, and identifies that the particular control information is control information for at least one CC other than a particular reference CC from among the CCs.

49. The apparatus of claim 48, wherein, if the bit number of the identification information is one bit, the control unit identifies that the particular control information is control information for two or fewer CCs other than the particular reference CC from among the CCs.

50. The apparatus of claim 48, wherein, if the bit number of the identification information is two bits, the control unit identifies that the particular control information is control information for four or fewer CCs other than the particular reference CC from among the CCs.

51. The apparatus of claim 50, wherein the control unit identifies that a CC indicator of the identification information for the particular reference CC is mapped to 0, and identifies that a CC indicator of the identification information for four or fewer CCs other than the particular reference CC is mapped to at least one of 1, 2, 3, and 4 by using the two bits.

52. The apparatus of claim 48, wherein, if the bit number of the identification information is three bits, the control unit identifies that the particular control information is control information for eight or fewer CCs other than the particular reference CC from among the CCs.

53. The apparatus of claim 52, wherein the control unit identifies that a CC indicator of the identification information for the particular reference CC is mapped to 0, and identifies that a CC indicator of the identification information for eight or fewer CCs other than the particular reference CC is mapped to at least one of 1, 2, 3, 4, 5, 6, 7, and 8 by using the three bits.

54. The apparatus of claim 48, wherein the particular reference CC comprises a Primary Component Carrier (PCC), which is a CC to configure a Primary serving cell (PCell).

55. The apparatus of claim 54, wherein the control unit identifies that a cell index of identification information for the PCell is mapped to 0, and identifies that a cell index of identification information for four or fewer SCells other than the PCell is mapped to at least one of 1, 2, 3, and 4 by using the two bits.

56. The apparatus of claim 55, further comprising a reception unit for receiving information of mapping between the cell indexes of the identification information for the PCell and the SCells and the identification information indicating the CCs configuring the PCell and the SCells through a broadcast channel.

57. The apparatus of claim 56, further comprising a reception unit for receiving information of mapping between the cell indexes of the identification information for the PCell and the SCells and the identification information indicating the CCs configuring the PCell and the SCells through a Radio Resource Control (RRC) message.

58. The apparatus of claim 54, wherein the control unit identifies that a cell index of identification information for the PCell is mapped to 0, and identifies that a cell index of identification information for eight or fewer SCells other than the PCell is mapped to at least one of 1, 2, 3, 4, 5, 6, 7, and 8 by using the three bits.

59. The apparatus of claim 58, further comprising a reception unit for receiving information of mapping between the cell indexes of the identification information for the PCell and the SCells and the identification information indicating the CCs configuring the PCell and the SCells through a broadcast channel.

60. The apparatus of claim 59, further comprising a reception unit for receiving information of mapping between the cell indexes of the identification information for the PCell and the SCells and the identification information indicating the CCs configuring the PCell and the SCells through a Radio Resource Control (RRC) message.

61. The apparatus of claim 48, wherein another CC other than the particular reference CC comprises a Secondary Component Carrier (SCC), which is a CC to configure a Secondary serving cell (SCell).

62. The apparatus of claim 48, wherein the apparatus receives a Physical Downlink Control Channel (PDCCH), and extracts the identification information configured as additional bits in a Downlink Control Information (DCI) format of the PDCCH.

63. The apparatus of claim 62, wherein the identification information is received through one of an anchor CC or the particular reference CC including the PDCCH.

* * * * *